Patented Jan. 26, 1932

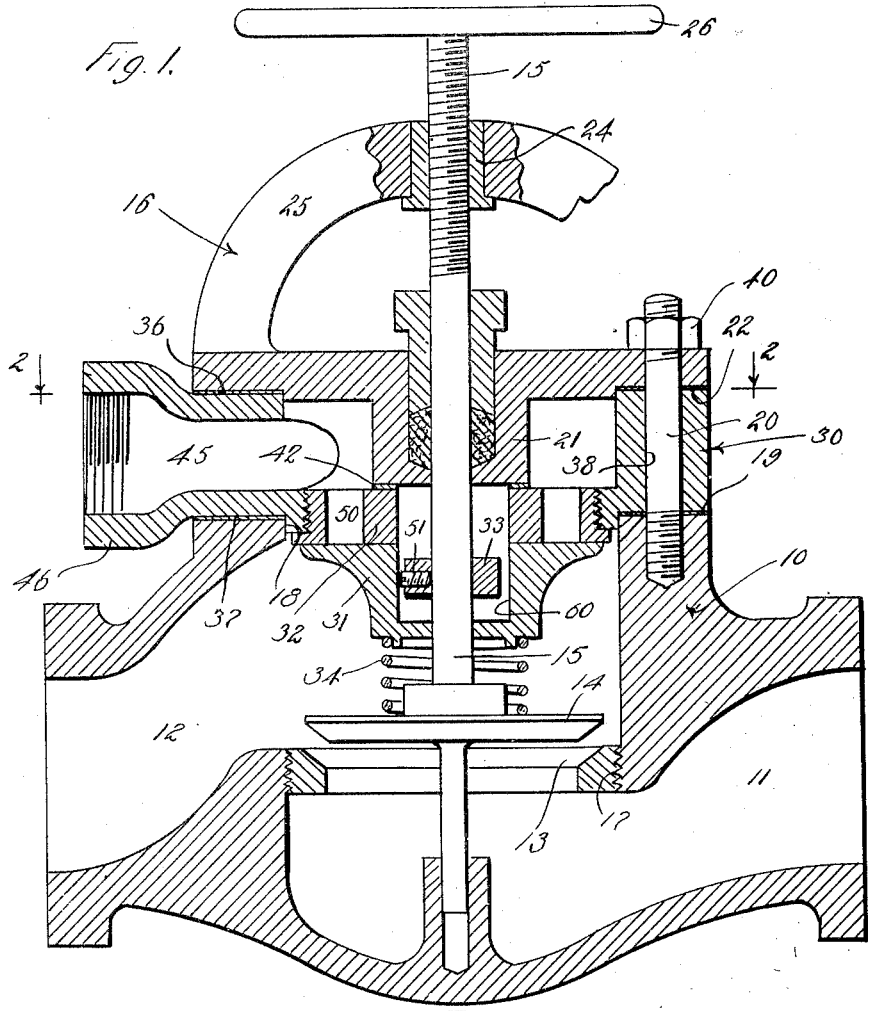
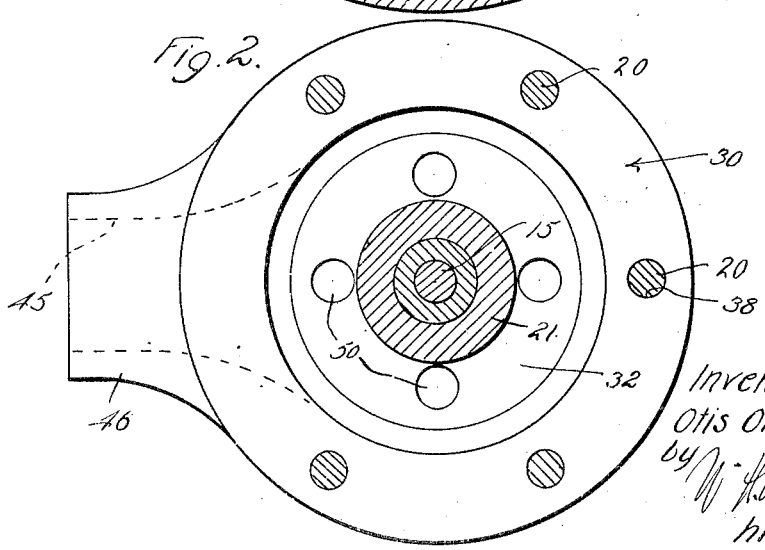

1,842,600

UNITED STATES PATENT OFFICE

OTIS ORA FUSCH, OF BELLFLOWER, CALIFORNIA

VALVE

Application filed March 14, 1927. Serial No. 175,091.

This invention has to do with a valve and it is a general object of the invention to provide a valve in which the pressure is relieved from the outlet side of the valve upon the valve being closed.

It is a general object of my present invention to provide a simple, effective and improved valve construction which operates to automatically relieve the pressure from the outlet side of the valve upon the valve being closed.

Another object of my invention is to provide a construction in the form of an attachment applicable to a standard form of valve to cause pressure at the outlet side of the valve to be relieved upon the valve being closed.

It is a further object of this invention to provide an attachment of the character mentioned which is simple of construction and easily applicable to a standard valve.

The various objects and features of my invention will be best and more fully understood from the following detailed description of a typical form and application of the invention, throughout which description reference is had to the accompanying drawings, in which:

Fig. 1 is a detailed, sectional view of a standard form of steam valve showing the construction provided by my invention applied thereto in the form of an attachment; and Fig. 2 is a sectional view, taken as indicated by line 2—2 on Fig. 1.

In various situations, particularly, in handling steam, air and various other fluids, it is desirable and, in some cases, necessary to relieve the pressure from the discharge side of the control valve upon the valve being closed, and it is further desirable that the outlet side of the valve remain open at all times when the valve is closed to prevent pressure from developing at the outlet side of the valve due to slight leakage of the valve or other causes. My invention provides a construction operable to automatically open and maintain open the exhaust or outlet side of a valve when the valve is closed. My construction lends itself readily to embodiment in the form of an attachment applicable to a standard form of valve and, therefore, I have in this disclosure set forth my invention in such form, it being understood, however, that I do not wish the broader principles of my invention limited to embodiment in a valve attachment as they may obviously be incorporated in a valve construction as a permanent and orignal part thereof.

In settng forth a preferred embodiment of my invention, I have disclosed it in the form of an attachment applied to a standard and typical form of control valve, such as is used almost universally in handling steam, gas, etc. The valve which I have disclosed in the drawings includes, generally, a body 10, having an inlet port 11 in one side and an outlet port 12 in the other side. A seat 13 is mounted in the body at the point of connection between the ports 11 and 12 and a valve 14 is arranged to co-operate with the seat. A stem 15 carries the valve, and a head 16 is applied to the top of the body 10 carrying the stem 15 so that it projects from the body and can be operated to move the valve 14 into and out of co-operative engagement with the seat 13. The body 10 may be of the usual construction provided with a screw-threaded part 17 to receive the seat 13 and having a comparatively large top opening 18 which is closed by the head 16. The opening 18 is made sufficiently large to pass the valve 14 and the seat 13. The top of the body 10 is provided with a flat annular face 19. Screw-threaded studs 20 project upwardly from the face 19 to hold the head 16. The head 16 is made to fit the top of the body 10 to close the opening 18 and has a central stuffing box 21 which passes the stem 15. The stuffing box normally extends downwardly into the body of the valve through the opening 18. The lower side of the head 16 is provided with a flat finished part 22 corresponding to the face 19 of the body. The head 16 has a screw-threaded part 24 through which the stem 15 is threaded so that rotation of the stem will cause it to move longitudinally and thus operate the valve 14 carried on its lower end. In the construction shown in the drawings, the threaded part 24 of the head is supported in spaced relation above the stuffing box 21 by suitable arms 25. The stem projects above the part 24 and is provided with an operating handle 26. In the ordinary use of the valve, the head 16 is applied to the body 10 so that its face 22 seats on the face 19 of the body while the studs 20 project through the head and carry nuts which operate to retain the head on the body.

My invention, when embodied in the form of an attachment, includes, generally, a member 30 or insert, as I will term it, to be inserted between the head 16 and the top of the body 10, a valve 31 to be arranged within the body 10 on the stem 15 to co-operate with a seat 32 provided on the lower side of the insert 30, a stop 33 to be applied to the stem 15 to engage and operate the valve 31, and a spring 34 to act on the valve 31 and normally urge it upwardly to engage the seat 32.

The insert 30 is annular in form and has its upper side or face 36 finished to fit the face 22 of the head 16 and has its lower side or face 37 finished to fit the upper face 19 of the body. Further, the insert has openings 38 formed through it to pass the studs 20 so that it can be inserted between the head 16 and body 10 with the studs extending through it and through the head so that nuts 40 applied to the upper ends of the studs hold it tightly between the body 10 and the head. It will be obvious that suitable gaskets may be inserted between the insert and the body and head. The insert 30 has a port or outlet opening 45 at one side and, in practice, the outlet port 45 terminates in an enlargement 46 on the exterior of the body, which enlargement may be threaded to receive a suitable pipe or fitting. This construction allows the insert to be made comparatively thin. The seat 32 is preferably formed separate from the insert 30 and is screwthreaded into the insert 30 so that it bears against the lower end of the stuffing box 21 of the head 16. In practice, a suitable gasket 42 may be inserted between the seat 32 and stuffing box to make a fluid tight connection. With this construction, the port 45 is separated from the interior of the body 10, that is, from the outlet port 12 of the body 10, by the seat member 32. In accordance with my invention, I form openings or ports 50 through the seat member 32 to connect the outlet port 12 and the port 45, and I relate the valve 31 to the member 32 so that it may seat on the member 32 in a manner to close the ports 50.

The valve 31, which may be termed a pressure release valve, is preferably fitted freely on the stem 15 and is normally urged upwardly by the spring 34 to seat on the member 32. In the arrangement shown in the drawings, the spring 34 is arranged under compression between the valve 31 and the valve 14 and thus normally urges the valve 31 upwardly on the stem. The stop 33 is set or fixed on the stem 15 by a setscrew 51, or the like, and is positioned on the stem to engage the valve 31 and move it away from the member 32 as the valve 14 is operated to its seat 13. The valve 31 is preferably provided in its upper side with a recess 60 in which the stop 33 operates, thus giving the stop sufficient movement between the valve 31 and the stuffing box 21 to allow full operation of the valve 14.

In using my invention, it is applied to or assembled with the main control valve in the manner clearly illustrated in Fig. 1, so that the valve 31 is held against the seat member 32 when the main valve 14 is open, thus keeping the ports 50 closed so that there is no escape of pressure from the discharge 12 of the main valve and the port 45 of the insert 30. The stop 33 is set so that the valve 31 opens immediately before the valve 14 becomes seated, thus opening the ports 50 so that pressure from the discharge port 12 is allowed to escape through the ports 50 and the port 45, while the valve 14 is closed. It will be apparent that my construction is entirely automatic in operation, and it will be obvious that it can be easily and quickly applied to a standard valve construction.

Having described only a typical preferred form of my invention, I do not wish to limit myself to the specific details set forth, but wish to reserve to myself any changes or variation that may appear to those skilled in the art or fall within the scope of the following claims.

Having described my invention, I claim:

1. In combination, a body, a head for the body, a main valve in the body, a stem carrying said valve and extending through the head, an annular member inserted between the body and head and having an outlet port, a release valve for closing the port and movable separately of the main valve, and means on the stem between the main valve and head whereby the release valve is opened when the main valve is closed.

2. An attachment for a valve having a body, a head to close the body, a main valve, and a stem to operate the main valve including an insert to go between the body and head and having an outlet port, a release valve for closing the port when the main valve is open, and a member applicable to the stem between the main valve and head to operate said last mentioned valve.

3. An attachment for a valve having a body, a head to close the body, a main valve, and a stem to operate the main valve including an insert to go between the body and head and having an outlet port, a release valve to be carried on the stem for closing the port when the main valve is open, and a member applicable to the stem to operate said last mentioned valve.

4. An attachment for a valve having a body, a head to close the body, a main valve, and a stem to operate the main valve including an insert to go between the body and head and having an outlet port, a release valve to be carried on the stem, a spring to hold the last mentioned valve closed when the main valve is open, and a member applicable to the stem to operate said last mentioned valve.

In witness that I claim the foregoing I have hereunto subscribed my name this 8th day of March, 1927.

OTIS ORA FUSCH.